United States Patent Office 3,296,004
Patented Jan. 3, 1967

3,296,004
NEUTRAL BROWN HEAT ABSORBING
GLASS COMPOSITION
James E. Duncan, Natrona Heights, Pa., assignor to Pittsburgh Plate Glass Company, Pittsburgh, Pa., a corporation of Pennsylvania
No Drawing. Filed Aug. 12, 1963, Ser. No. 301,669
10 Claims. (Cl. 106—52)

The present invention relates to a neutral brown (bronze) colored, heat absorbing glass, and it has particular relation to a neutral brown (bronze) colored, heat absorbing sheet or plate glass having controlled energy and light transmittance characteristics.

Architects and building owners have shown an increasing interest in glazing windows in buildings with a neutral warm brown or bronze colored glass. This type of glass is desired to reduce glare and to provide a pleasing color in combination with intertior decorations. It is also desired that the glass absorb a substantial portion of the heat from the sun's rays. This reduces the load on air conditioning systems employed to control the temperature of the interior of the building and permits the use of smaller and less costly systems.

In order for a glazing glass to qualify as a heat absorbing glass, it must have a total solar energy transmittance of less than 50 percent at one-quarter inch thickness. This standard has been established by Federal specification DD–G–451A. The conventional type of heat absorbing glass has a bluish-green color imparted to it by the incorporation of controlled amounts of iron oxide in the glass. The bluish-green color of this type of glass is objected to by architects and building owners for aesthetic reasons. It is therefore an object of the present invention to provide a pleasing brown colored, heat absorbing glass which is suitable for glazing windows in building structures.

The development of a neutral brown glass having a pleasing color has required a careful consideration of the transmittance characteristics of the glass. The luminous transmittance must be limited in order to provide the desired protection from glare or excessive brightness. Glasses are available which have proper heat absorptive properties but which have undesirably low luminous transmittance. If the luminous transmittance is limited to too great an extent, the glass presents a degree of dreariness or depression on dark days.

The present invention contemplates a neutral brown, heat absorbing glass having a luminous transmittance of between 48 and 56 percent, usually between 49 and 55 percent and preferably about 51 to 54 percent at one-quarter inch thickness. This is a radical departure from glasses presently known and used in buildings.

The luminous transmittance is the summation of the percentage of the incident, visible radiant energy (weighted by the energy distribution of the source and the eye's sensitivity) that will pass through the glass as described. In the present invention the source, unless otherwise stated, is Illuminant "C," a standard source adopted by the International Commission on Illumination.

It is desired that the glass approach neutrality of color for aesthetic reasons. A neutral colored glass with a warm brown tint has been found to provide a most pleasing colored glass. A sheet of the glass one-quarter inch in thickness should have substantially uniform transmittance of light in the portion of the spectrum lying between 400 and 750 millimicrons; an excitation purity of between 6.0 and 12 percent and usually between 7 and 10.5 percent; a dominant wavelength of between 578 and 582 millimicrons and usually about 580 millimicrons; and a total solar energy transmission of less than 50 percent and usually between 45 and 49.8 percent.

The specifications for determining color, such as the dominant wavelength and excitation purity, have been derived from tristimulus values that have been adopted by the International Commission on Illumination as a direct result of experiments involving many observers. These specifications can be determined by calculating the trichromatic coefficients, X, Y and Z, from the tristimulus values. The trichromatic coefficient, X and Y, are plotted on a chromaticity diagram and compared with the coordinates of Illuminant C as a standard light source. This comparison provides the information to determine the excitation purity and dominant wavelength. The lower the excitation purity of a color, the closer it is to being a neutral color. An understanding of these terms and definitions thereof may be had by referring to the Handbook of Colorimetry prepared by the staff of the Color Measurement Laboratory, Massachusetts Institute of Technology, under the direction of Arthur C. Hardy. This book was printed in 1936 by the Technology Press, Massachusetts Institute of Technology, Cambridge, Massachusetts. The trichromatic coefficient values for the neutral brown glass compositions of this invention range as follows:

| Trichromatic Coefficients | Permissive Range | Usual Range |
|---|---|---|
| X | 0.322 to 0.332 | 0.324 to 0.330 |
| Y | 0.320 to 0.350 | 0.325 to 0.345 |
| Z | 0.358 to 0.318 | 0.351 to 0.325 |

The trichromatic coefficient Z value is obtained by adding X and Y and subtracting the total from 1.0.

In accordance with the present invention, a glass having the desired color and transmittance properties is provided. Such a glass is substantially free of nickel and contains by weight 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent CaO, 0 to 10 percent MgO, the sum of CaO and MgO being 6 to 20 percent, 0.2 to 1 percent $Fe_2O_3$, 0.001 to 0.02 percent CoO, 0.0002 to 0.02 percent Se, 0 to 5.0 percent $Al_2O_3$, 0 to 1.0 percent Cl and 0 to 1.0 percent $SO_3$.

Preferred ranges of compositions that are illustrative of the invention are as follows:

| Components | Weight Percent | |
|---|---|---|
| $SiO_2$ | 65 to 74 | 68 to 72 |
| $Na_2O$ | 11 to 15 | 11 to 14 |
| $K_2O$ | 0 to 5 | 0 to 1 |
| $Na_2O$ plus $K_2O$ | 11 to 16 | 11 to 15 |
| CaO | 6 to 15 | 6 to 13 |
| MgO | 1 to 6 | 1.5 to 4 |
| CaO plus MgO | 10 to 16 | 10 to 15 |
| $Fe_2O_3$ | 0.2 to 0.8 | 0.2 to 0.5 |
| CoO | 0.002 to 0.01 | 0.002 to 0.005 |
| Se | 0.001 to 0.015 | 0.001 to 0.01 |
| $Al_2O_3$ | 0 to 5.0 | 0 to 5.0 |
| Cl | 0 to 0.5 | 0 to 0.5 |
| $SO_3$ | 0 to 0.6 | 0 to 0.6 |

$SiO_2$ is the glass former. Sodium oxide is present as a flux to reduce the melting temperature of the glass. Potassium oxide may be employed in place of a portion of the $Na_2O$, but the use of $Na_2O$ is preferred because it is less expensive. The total amount of alkali metal oxide in the glass should range from 11 to 21 percent by weight. CaO and MgO are also employed as fluxes. They are used to supplement the $Na_2O$ because they improve the chemical durability of the glass. The amount of alkaline earth metal oxides in the glass can range from 6 to 20 percent by weight.

Alumina may be present in the glass in varying amounts, depending mainly upon the manner in which the glass is formed. Alumina is employed to regulate the viscosity of the glass, improve its durability and prevent devitrification of the glass. Relatively small amounts of alumina, for example, less than 1.0 percent by weight, are employed when plate glass is cast from a pot or made in a tank and formed by rolling it horizontally between sizing rolls. However, when the glass is formed by drawing it vertically from the kiln of a tank over a draw bar and upwardly between rollers (sheet glass), up to 5 percent by weight alumina can be employed. Usually, however, from 1.0 to 3.5 percent by weight alumina is employed when forming glass by the sheet or vertical drawing procedure.

Trace amounts of $TiO_2$ are frequently present, e.g., in amounts up to 0.05 percent by weight, as an impurity.

$Fe_2O_3$ is employed principally to provide the desired heat absorbing properties to the glass. CoO and Se are present in combination with $Fe_2O_3$ to provide the desired luminous and total energy transmittance and color to the glass. With the proper combination of the three colorants it has been discovered that a pleasing neutral brown or bronze color can be produced. Such glass does not have an undesirable greenish brown cast but instead possesses the warmth of a neutral brown glass combined with a high luminous transmittance in the visible range and sufficient heat absorptive properties to make it unusually attractive for glazing windows in the buildings.

The glasses of the invention can be produced from conventional glass making materials properly compounded and thoroughly mixed so as to yield, when reacted, glasses of the desired ultimate composition. Suitable batch materials include sand, soda ash, potassium carbonate, limestone, dolomite, aluminum hydrate, salt cake, common salt, sodium nitrate, arsenious oxide, antimony oxide, aplite, feldspar, rouge cobalt oxide and selenium metal. The salt cake, common salt, sodium nitrate, antimony oxide, arsenious oxide and combinations thereof may be present in the batch to act as refining agents.

Various size pots or crucibles can be employed and the melting temperatures and times will vary according to the amount being formed. Also, the glass can be formed continuously in the form of a sheet when made in a tank.

EXAMPLE I

| Batch ingredient: | | Weight parts (for batch) |
|---|---|---|
| Sand | pounds | 1000 |
| Soda ash | do | 277 |
| Limestone | do | 217 |
| Dolomite | do | 149 |
| Sodium nitrate | do | 30 |
| Common salt | do | 25 |
| Salt cake | do | 10 |
| Rouge (98 percent $Fe_2O_3$) | do | 6.25 |
| Cobalt oxide | ounces | 0.75 |
| Selenium | do | 1.75 |

A laboratory pot glass batch, which is illustrative of the present invention, is prepared by thoroughly mixing one-twentieth weight fraction of the above batch ingredients (5 percent). This smaller pot batch yields approximately 70 pounds of glass after melting and fining which is conducted as follows:

An empty refractory clay pot is preheated in the furnace at a furnace temperature of about 2100° F., the furnace being heated by the controlled combustion of natural gas. A portion (approximately ⅓) of the mixed batch is ladled into the preheated pot and the furnace temperature is gradually increased. The remaining portion of the mixed batch is ladled into the pot over a period of 2 hours, and the temperature is raised gradually to about 2650° F. during this time. The temperature is maintained at 2650° F. for the next 3¾ hours to refine the glass. At the end of this time, the chemical reactions are completed; the glass is free of bubbles and is substantially homogeneous.

In the preparation of the glasses of the present invention, neutral to oxidizing conditions are observed in the melting and fining furnace.

After the glass is refined, the temperature of the furnace is reduced to 2100° F. over a period of ¾ hour. The furnace is then held at this temperature for ½ hour. The pot is removed from the furnace and the glass is poured on a metal table and rolled in the form of a plate. The plate is placed in a kiln and cooled from 1150° F. to 800° F. at a rate of about 7° F. per minute. Thereafter the glass is cooled more rapidly to room temperature and subsequently cut into pieces suitable for grinding, polishing and testing.

The calculated composition of the above given batch is as follows:

| Component: | Calculated percent by W. |
|---|---|
| $SiO_2$ | 70.9 |
| $Na_2O$ | 13.5 |
| CaO | 11.7 |
| MgO | 2.3 |
| $SO_3$ | 0.4 |
| Cl | 0.5 |
| $Fe_2O_3$ | 0.5 |
| $Al_2O_3$ | 0.2 |
| CoO | 0.003 |
| Se | 0.008 |

A chemical analysis of a sample of the glass made in a clay pot yields the following composition:

*Wet chemical analysis*

| Component: | Percent by W. |
|---|---|
| $SiO_2$ | 70.89 |
| $Na_2O$ | 12.97 |
| $K_2O$ | 0.06 |
| CaO | 11.90 |
| MgO | 2.43 |
| $SO_3$ | 0.47 |
| Cl | 0.57 |
| $Al_2O_3$ | 0.22 |

*Absorption spectrophotometric analysis*

| Component: | Percent by W. |
|---|---|
| $Fe_2O_3$ | .48 |
| $TiO_2$ | .02 |
| CoO | .0039 |
| Se | .0020 |
| Total | 100.01 |

The difference in the selenium content between the calculated composition and the absorption spectrophotometric analysis is not surprising since selenium is volatile and a good portion thereof is lost in melting and fining. This factor coupled with the reasonable realm of experimental error involved in the absorption spectrophotometric analysis for selenium (a difficult metal to analyze) accounts for the difference in selenium content between the calculated composition and the analysis.

A one-quarter inch thick sample of a glass made by the pot method when subjected to optical and spectral transmittance measurements yields the following values:

| Property: | |
|---|---|
| Luminous transmittance (illuminant "C") percent | 53.5 |
| Total solar energy transmittance do | 49.4 |
| Excitation purity do | 9.0 |
| Dominant wavelength millimicrons | 579 |
| Trichromatic coefficients (plus or minus 0.0005): | |
| X | .3276 |
| Y | .3314 |
| Z | .3410 |

A typical batch formula which was used when this glass was made in a tank and formed as a continuous ribbon was as follows.

EXAMPLE II

| Batch ingredient: | Weight parts (for batch), pounds |
|---|---|
| Sand | 1000 |
| Soda ash | 302 |
| Limestone | 210 |
| Dolomite | 157 |
| Sodium nitrate | 30 |
| Common salt | None |
| Salt cake | 10 |
| Rouge (97 percent $Fe_2O_3$) | 5.3 |
| Cobalt oxide | .054 |
| Selenium | .110 |

Representative samples of glass taken during various stages of a given production campaign were subjected to chemical analyses, yielding the following results:

WET CHEMICAL ANALYSIS

| | Sample "1" (percent) | Sample "2" (percent) | Sample "3" (percent) |
|---|---|---|---|
| $SiO_2$ | 71.23 | 71.25 | 71.21 |
| $Na_2O$ | 13.58 | 13.56 | 13.60 |
| $K_2O$ | 0.08 | 0.08 | 0.07 |
| CaO | 11.74 | 11.74 | 11.74 |
| MgO | 2.52 | 2.53 | 2.53 |
| $SO_3$ | 0.31 | 0.29 | 0.31 |
| $Al_2O_3$ | 0.10 | 0.11 | 0.10 |

ABSORPTION SPECTROPHOTOMETRIC ANALYSIS

| | | | |
|---|---|---|---|
| $Fe_2O_3$ | 0.40 | 0.39 | 0.41 |
| $TiO_2$ | 0.01 | 0.01 | 0.01 |
| CoO | 0.0035 | 0.0033 | 0.0036 |
| Cl | 0.02 | 0.02 | 0.02 |
| Se | 0.002 | 0.0017 | 0.0014 |
| Total | 99.99 | 99.99 | 100.0 |

Typical transmittance data at the various wavelengths indicated hereinbelow for 0.250 inch thick test representative samples of glass plates formed at a given stage in a continuous production campaign by the tank method marked "A" and by pot method marged "B" are tabulated below.

| Wavelength (millimicrons) | Percent Transmittance | |
|---|---|---|
| | "A" | "B" |
| Ultraviolet: | | |
| 300 | 0.0 | 0.0 |
| 310 | 0.0 | 0.0 |
| 320 | 0.0 | 0.0 |
| 330 | 0.0 | 0.0 |
| 340 | 0.3 | 0.0 |
| 350 | 7.1 | 5.1 |
| 360 | 22.8 | 19.2 |
| 370 | 34.8 | 31.1 |
| 380 | 34.1 | 29.5 |
| 390 | 43.0 | 41.3 |
| Visible: | | |
| 400 | 48.5 | 48.2 |
| 420 | 46.7 | 48.0 |
| 440 | 44.3 | 46.0 |
| 460 | 44.1 | 46.8 |
| 480 | 43.3 | 46.5 |
| 500 | 43.6 | 46.7 |
| 520 | 45.2 | 48.4 |
| 540 | 49.0 | 52.4 |
| 560 | 54.1 | 57.4 |
| 580 | 52.5 | 56.3 |
| 600 | 51.7 | 55.5 |
| 620 | 52.7 | 56.5 |
| 640 | 51.5 | 55.4 |
| 660 | 51.6 | 54.9 |
| 680 | 54.4 | 56.9 |
| 700 | 56.6 | 58.7 |
| 720 | 55.7 | 58.0 |
| 740 | 53.3 | 55.8 |
| 750 | 52.0 | 54.7 |
| Infrared: | | |
| 800 | 46.7 | 49.7 |
| 900 | 39.0 | 42.3 |
| 1,000 | 36.3 | 39.4 |
| 1,100 | 35.2 | 38.4 |
| 1,200 | 35.8 | 38.9 |
| 1,300 | 37.8 | 39.3 |

| Wavelength (millimicrons) | Percent Transmittance | |
|---|---|---|
| | "A" | "B" |
| infrared; Continued | | |
| 1,400 | 43.7 | 47.1 |
| 1,500 | 50.3 | 52.8 |
| 1,600 | 55.3 | 58.9 |
| 1,700 | 57.3 | 60.0 |
| 1,800 | 57.8 | 60.1 |
| 1,900 | 57.6 | 60.6 |
| 2,000 | 58.9 | 61.9 |
| 2,100 | 60.0 | 63.4 |

Glasses within the purview of the present invention can have transmittance values in the visible portion of the spectrum which may vary about 8 percent in transmittance above or 8 percent in transmittance below the transmittance values given above at a particular wavelength.

The spectral transmittance measurements of the glasses of the present invention are made by standard spectrophotometric methods utilizing three different spectrophotometers. A Bechman Quartz Spectrophotometer, Model DU is used for wavelengths between 300 and 400 millimicrons and between 750 and 1000 millimicrons. A General Electric Recording Spectrophotometer, Model No. 5962005G3 is used for the visible range of the spectrum, 400 to 750 millimicrons. A Perkin-Elmer Spectrophotometer, Model 12 having a NaCl prism is used for wavelengths above 1000 millimicrons.

The batch formulas, calculated compositions and chemical analyses set forth herein represent preferred compositions for nominal ¼ inch thicknesses, viz. 0.250 inch thick plus or minus about 0.030 inch. The amounts of the colorants, $Fe_2O_3$, CoO and Se, must be carefully controlled to achieve the desired color, transmittance and heat-absorbing characteristics at various thicknesses. Exemplary weight ranges for the colorants for ¼ inch thick glass are 0.3 to 0.5 percent $Fe_2O_3$, 0.002 to 0.005 percent CoO and 0.001 to 0.003 percent Se. When the glasses are fabricated at greater or lesser thicknesses than ¼ inch, it is necessary to decrease or increase, respectively, the amounts of each colorant to obtain the requisite color, transmittance and heat-absorbing characteristics. For example, when the glass is produced in ⅛ inch thickness, the amount of each of the colorants can be approximately doubled to achieve the same color, heat absorption and transmittance characteristics.

If too much $Fe_2O_3$ is employed to make a glass of a given thickness, the color is more green than desired and the luminous transmittance will be reduced. If too little $Fe_2O_3$ is used, the heat absorption properties of the glass are diminished. If too much selenium is present, the color of the glass is more red than desired; and if too little selenium is present, the color is more bluish green than desired. If the glass contains too much CoO, its color is more blue than desired; whereas, if the glass does not contain enough CoO, its color is more greenish brown than is desired. Although NiO usually provides a reddish brown color to lime-soda-silica glasses, its presence is not desirable in any appreciable amount in the glasses of the invention for it tends to lower the luminous transmittance too much when combined with the above described amounts of $Fe_2O_3$, Se and CoO which are employed to obtain high solar energy absorption, relatively high luminous transmittance for a heat absorbing glass and the warm brown color.

As mentioned hereinabove, the glasses of this invention are heat absorbing and provide a high measure of solar heat control. Typical solar transmittance data for nominal 0.250 inch thick (plus or minus 0.001 inch) representative glass plates produced by the tank method during the campaign referred to above in Example 2 is as follows:

|  | Mode[1] | Range | Typical[2] |
|---|---|---|---|
| Thickness (inches) | 0.250 | 0.249 to 0.251 | 0.250 |
| Solar Light Transmittance (percent) | 49.8 | 48.7 to 51.1 | 50.2 |
| Total Solar Ultraviolet Transmittance (percent) | 26.8 | 24.4 to 27.5 | 25.7 |
| Total Solar Infrared Transmittance (percent) | 42.4 | 39.3 to 43.5 | 42.4 |
| Total Solar Energy Transmittance (percent) | 46.8 | 45.0 to 47.4 | 46.6 |
| Total Light Transmittance Illuminant "C" (corrected to 0.250 inch) (percent) | 49.8 | 48.7 to 51.0 | 50.1 |
| Excitation Purity (percent) | 7.2 | 6.7 to 9.5 | 7.8 |
| Dominant Wavelength (millimicrons) | 580.4 | 579.4 to 581.4 | 580.4 |

[1] The mode is the value which occurs most frequently.
[2] The typical is one particular sample representing accumulated data.

The total solar energy transmittance values as reported herein are calculated from the spectral transmittance of the glass and the spectral distribution of solar radiant energy. The latter values are those of Parry Moon (Journal of the Franklin Institute, vol 230, November 1940).

The glass as thus produced represents a fresh approach; a change in the appearance of glazing glasses. It provides architects with complete freedom from color problems in daylight for interior planning. The careful selection of colorants permits the production of a glass having excellent brightness or glare control. It also permits the production of a glass having a high order of solar heat absorption with a pleasing neutral brown color. These properties can be readily reproduced in successive melts of the glass.

The glasses of this invention can be employed in laminates; windows; television implosion panels, tempered or untempered, curved or flat; sliding glass doors; glass curtain walls; glass facades for buildings and insulating glass structures, e.g. those having a plurality of layers of glass mounted in a common frame and having air as an insulation medium between the plates.

Although the present invention has been described with reference to specific details of certain embodiments, it is not intended that such details act as limitations upon the scope of the invention except insofar as included in the accompanying claims.

I claim:

1. A neutral brown colored, heat absorbing glass having substantially uniform transmittance of light in the portion of the spectrum lying between 400 and 750 millimicrons and an excitation purity between 6 and 12 percent, consisting essentially of the following ingredients in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent $CaO$, 0 to 10 percent $MgO$, the sum of $CaO$ and $MgO$ being 6 to 20 percent, 0.2 to 1 percent $Fe_2O_3$, 0.001 to 0.02 percent $CoO$ and 0.0005 to 0.02 percent Se, the amounts of Se, $CoO$ and $Fe_2O_3$ being coordinated to produce a neutral brown glass having said transmittance properties.

2. A glass according to claim 1 containing up to 5 percent by weight $Al_2O_3$.

3. A neutral brown colored, heat absorbing glass having substantially uniform transmittance of light in the portion of the spectrum lying between 400 and 750 millimicrons, a dominant wavelength of between 578 and 582 millimicrons, and an excitation purity between 6 and 12 percent, consisting essentially of the following ingredients in percent by weight: 65 to 74 percent $SiO_2$, 11 to 15 percent $Na_2O$, 0 to 5 percent $K_2O$, the sum of $Na_2O$ and $K_2O$ being 11 to 16 percent, 6 to 15 percent $CaO$, 1 to 6 percent $MgO$, the sum of $CaO$ and $MgO$ being 10 to 16 percent, 0.2 to 0.8 percent $Fe_2O_3$, 0.002 to 0.01 percent $CoO$ and 0.001 to 0.015 percent Se, the amounts of Se, $CoO$ and $Fe_2O_3$ being coordinated to produce a neutral brown glass having said transmittance properties.

4. A glass according to claim 3 containing up to 5 percent by weight $Al_2O_3$.

5. A neutral brown colored, heat absorbing glass having substantially uniform transmittance of light in the portion of the spectrum lying between 400 and 750 millimicrons, a dominant wavelength of between about 578 and about 582 millimicrons, and an excitation purity between about 6 and about 9.5 percent, consisting essentially of the following ingredients in percent by weight: 68 to 72 percent $SiO_2$, 11 to 14 percent $Na_2O$, 0 to 1 percent $K_2O$, the sum of $Na_2O$ and $K_2O$ being 11 to 15 percent, 6 to 13 percent $CaO$, 1.5 to 4 percent $MgO$, the sum of $CaO$ and $MgO$ being 10 to 15 percent, 0.2 to 0.5 percent $Fe_2O_3$, 0.002 to 0.005 percent $CoO$ and 0.001 to 0.01 percent Se, the amounts of Se, $CoO$ and $Fe_2O_3$ being coordinated to produce a neutral brown glass having said transmittance properties.

6. A glass according to claim 5 containing up to 5 percent by weight $Al_2O_3$.

7. An article of manufacture comprising a neutral brown colored, heat absorbing plate of glass at a thickness suitable for glazing so as to have substantially uniform transmission of light in the portion of the spectrum lying between 400 and 750 millimicrons, an excitation purity between 6 and 12 percent and a total luminous transmittance between 48 and 56 percent, consisting essentially of the following ingredients in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent $CaO$, 0 to 10 percent $MgO$, the sum of $CaO$ and $MgO$ being 6 to 20 percent, 0.2 to 1 percent $Fe_2O_3$, 0.001 to 0.02 percent $CoO$ and 0.0005 to 0.02 percent Se, the amounts of Se, $CoO$ and $Fe_2O_3$ being coordinated to produce a neutral brown glass having said transmittance properties.

8. An article of manufacture as in claim 7 wherein said glass contains up to 5 percent $Al_2O_3$.

9. An article of manufacture comprising a neutral brown colored, heat absorbing plate of glass approximately one-eighth to approximately one-quarter inch in thickness suitable for glazing purposes and having substantially uniform transmission of light in the portion of the spectrum lying between 400 and 750 millimicrons, an exitation purity of between 6 and 12 percent and a total luminous transmittance between 48 and 56 percent, the glass consisting essentially of the following ingredients in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent $CaO$, 0 to 10 percent $MgO$, the sum of $CaO$ and $MgO$ being 6 to 20 percent, together with 0.3 to 0.5 percent $Fe_2O_3$, 0.002 to 0.005 percent $CoO$ and 0.001 to 0.003 percent Se at one-quarter inch thickness, the amount of the colorants $Fe_2O_3$, $CoO$ and Se being greater as the thickness of the sheet is less than one-quarter inch and being approximately twice the above listed amount for each colorant when the thickness of the plate is one-eighth inch.

10. A glass article as in claim 9 wherein said glass contains up to 5 percent $Al_2O_3$.

References Cited by the Examiner

UNITED STATES PATENTS 2,902,377   9/1959   Duncan _____ 106—52
2,938,808   5/1960   Duncan et al. _____ 106—52

TOBIAS E. LEVOW, *Primary Examiner.*

H. McCARTHY, *Assistant Examiner.*

UNITED STATES PATENT OFFICE
CERTIFICATE OF CORRECTION

Patent No. 3,296,004                January 3, 1967

James E. Duncan

It is hereby certified that error appears in the above numbered patent requiring correction and that the said Letters Patent should read as corrected below.

Column 7, line 47, beginning with "in percent" strike out all to and including "properties" in line 55 same column 7 and insert instead the following:

> in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent $CaO$, 0 to 10 percent $MgO$, the sum of $CaO$ and $MgO$ being 6 to 20 percent, 0.2 to 1 percent $Fe_2O_3$, 0.001 to 0.02 percent $CoO$ and 0.0005 to 0.02 percent Se, the amounts of Se, CoO and $Fe_2O_3$ being coordinated to produce a neutral brown glass having said transmittance properties.

Signed and sealed this 13th day of August 1968.

(SEAL)

Attest:
EDWARD M. FLETCHER, JR.
Attesting Officer

EDWARD J. BRENNER
Commissioner of Pat